(12) United States Patent
Gu

(10) Patent No.: US 10,038,743 B2
(45) Date of Patent: Jul. 31, 2018

(54) METHOD AND SYSTEM FOR USER AND DEVICE MANAGEMENT OF AN IOT NETWORK

(71) Applicant: Cybrook Inc., Santa Clara, CA (US)

(72) Inventor: Qunshan Gu, Santa Clara, CA (US)

(73) Assignee: Cybrook Inc., Santa Clara, CA (US)

( * ) Notice: Subject to any disclaimer, the term of this patent is extended or adjusted under 35 U.S.C. 154(b) by 209 days.

(21) Appl. No.: 14/982,788

(22) Filed: Dec. 29, 2015

(65) Prior Publication Data

US 2017/0019460 A1 Jan. 19, 2017

Related U.S. Application Data

(63) Continuation-in-part of application No. 14/802,098, filed on Jul. 17, 2015.

(51) Int. Cl.
G06F 15/173 (2006.01)
H04L 29/08 (2006.01)
H04L 29/06 (2006.01)

(52) U.S. Cl.
CPC .............. *H04L 67/10* (2013.01); *H04L 63/08* (2013.01)

(58) Field of Classification Search
CPC ................................ H04L 67/10; H04L 63/08
USPC .................... 709/225, 226, 223, 224
See application file for complete search history.

(56) References Cited

U.S. PATENT DOCUMENTS

| | | | | |
|---|---|---|---|---|
| 9,894,159 B2* | 2/2018 | Chen | ...................... | H04L 67/12 |
| 9,923,715 B2* | 3/2018 | Smith | ................... | H04L 9/0833 |
| 2015/0222621 A1* | 8/2015 | Baum | .................... | H04W 4/70 726/9 |
| 2016/0072839 A1* | 3/2016 | Mortimore, Jr. | .... | H04L 63/0876 726/1 |
| 2016/0285628 A1* | 9/2016 | Carrer | ................... | H04L 9/3228 |
| 2016/0294837 A1* | 10/2016 | Turgeman | ............ | H04L 63/102 |
| 2016/0306974 A1* | 10/2016 | Turgennan | ......... | G06Q 20/4016 |
| 2016/0307191 A1* | 10/2016 | Turgennan | .......... | G06Q 20/382 |
| 2016/0365975 A1* | 12/2016 | Smith | ................... | H04L 9/0822 |
| 2016/0381030 A1* | 12/2016 | Chillappa | ............. | H04L 63/102 726/11 |
| 2017/0060911 A1* | 3/2017 | Loscalzo | .......... | G06F 17/30569 |
| 2017/0064550 A1* | 3/2017 | Sundaresan | .......... | H04W 12/06 |
| 2017/0093700 A1* | 3/2017 | Gilley | ..................... | H04L 45/44 |
| 2017/0171178 A1* | 6/2017 | Reynders | ............... | H04L 63/08 |
| 2017/0171180 A1* | 6/2017 | Britt | ....................... | H04L 63/08 |
| 2017/0171181 A1* | 6/2017 | Britt | ....................... | H04L 63/08 |
| 2017/0195424 A1* | 7/2017 | Nasir | .................... | H04L 67/125 |

(Continued)

*Primary Examiner* — Thu Ha T Nguyen (57) ABSTRACT

Methods and apparatuses for management of an Internet of Things (IoT) network are herein disclosed as comprising, in an implementation, authenticating a first device associated with a first account name and a second device associated with a second account name with a server associated with the IoT network, connecting the authenticated first device and the authenticated second device over a communication system, and communicating data between the first device and the second device connected to the communication system by generating, by the first device, data representative of a data type using a component of one of the first device and the second device and transmitting, using the communication system, the data to the second device. The communicated data may be video data, image data, audio data, alert data, or location data generated using components associated with the first device.

20 Claims, 8 Drawing Sheets

(56) References Cited

U.S. PATENT DOCUMENTS

| | | | |
|---|---|---|---|
| 2017/0295173 A1* | 10/2017 | Walsh | H04L 63/0861 |
| 2017/0353859 A1* | 12/2017 | Idnani | H04W 12/08 |
| 2017/0359343 A1* | 12/2017 | Sterl | H04L 63/0876 |
| 2017/0359417 A1* | 12/2017 | Chen | H04L 67/12 |
| 2018/0077449 A1* | 3/2018 | Herz | H04N 21/43615 |
| 2018/0084085 A1* | 3/2018 | Shannnugasundaram | H04L 67/42 |

\* cited by examiner

METHOD AND SYSTEM FOR USER AND DEVICE MANAGEMENT OF AN IOT NETWORK

CROSS-REFERENCE TO RELATED APPLICATION(S)

This application claims priority as a continuation-in-part under 35 U.S.C. § 120 to pending U.S. patent application Ser. No. 14/802,098, filed Jul. 17, 2015, the disclosure of which is incorporated by reference.

TECHNICAL FIELD

This disclosure relates to user and device management of an Internet of Things (IoT) network and more specifically to methods and apparatuses for management of users and devices in an IoT network.

BACKGROUND

Internet of Things (IoT) includes a network of connected devices, which can offer advanced connectivity of devices, systems and services. The devices are used to sense, receive, transmit information as well as communicate with other devices, networks, or computers.

SUMMARY

Disclosed herein are aspects of methods and apparatuses for user and device management of an IoT network. One aspect of the disclosure is a method for using associated devices connected to an Internet of Things (IoT) network to communicate data, comprising authenticating a first device associated with a first account name and a second device associated with a second account name with a server associated with the IoT network, connecting the authenticated first device and the authenticated second device over a communication system, and communicating data between the first device and the second device connected to the communication system by generating, by the first device, data representative of a data type using a component of one of the first device and the second device and transmitting, using the communication system, the data to the second device.

Another aspect of the disclosure is a system for communicating data between associated devices connected to an Internet of Things (IoT) network, comprising at least one memory and at least one processor configured to execute instructions stored in the memory to authenticate a first device associated with a first account name and a second device associated with a second account name, connect the authenticated first device and the authenticated second device over a communication system, and communicate data between the first device and the second device connected to the communication system by generating, by the first device, data representative of a data type using a component of one of the first device and the second device and transmitting, using the communication system, the data to the second device.

These and other aspects of the present disclosure are disclosed in the following detailed description of the embodiments, the appended claims and the accompanying figures.

BRIEF DESCRIPTION OF THE DRAWINGS

The invention is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The Internet is a world-wide system of computer networks and computers which communicate via a standard Internet protocol suite such as, for example, TCP, (i.e., Transmission Control Protocol) and IP (i.e., Internet Protocol). The Internet of Things ("IoT") includes devices which sense, receive, or transmit information as well as communicate with other devices, networks or computers. Each device in an IoT network may be uniquely designated by an identifier such as, for example, a radio frequency identifier, or an address. An IoT network can include devices such as sensors, actuators, cell phones, appliances, and other devices that can be connected.

IoT networks, because of the large number of connected devices, often lack the security of a login mechanism of a central server, which is typically used to manage interconnection in media systems such as video, audio and messenger and are also frequently isolated from social networks. Implementations of the current disclosure describe methods and apparatuses for authenticating devices with a server using an account name that allows for communication between devices. The same account name can be associated with any number of device identifiers and may also be used for social networking applications, thus providing a network which can include social networking and IoT connectivity functionalities simultaneously. Multiple devices associated with the same account can be logged onto the server regardless of how many devices are associated with the same account name. Furthermore, devices and their interconnectivity (i.e., connectivity with other devices) can be managed by different policies assigned based on their account names. For example, devices can be connected automatically with each other when they share the same account name, or belong to the same group. Thus, a remote device can act as a monitoring or tracking device without server or human intervention. For example, video or audio communication can be established between two automatically connected devices associated with the same account. In some implementations, different devices can be assigned different policies for their interconnectivity.

Further to this end, an IoT network may be used for communicating data generated by a first network-connected device to a second network-connected device, such as a first and second device that have been authenticated with one another. The first device may generate one or more of various forms of data, for example, location data, video data, image data, and sound data. The different types of data generated by the first device may be generated using distinct hardware components of the first device. For example, location data may be generated by a geolocation or global position system component of the first device, whereas video data may be generated using image and sound capture components, such as camera and microphone, of the first device.

Implementations of the current disclosure describe methods and apparatuses for communicating data generated by a first network-connected device to a second network-connected device using a mobile application executed on each of the first and second network-connected devices. A single instance of the mobile application may be shared between the first and second network-connected devices, or each device may execute an instance of the mobile application. The mobile application comprises user interface features for authenticating network-connected devices, generating data, and communicating the generated data to authenticated devices. For example, the mobile application may include modules for generating data types, wherein a first module is used for generating location data and may be represented by a satellite icon in a user interface that, when toggled, causes a geolocation or global positioning system component of the device to generate data indicative of a location of the device or an authenticated device. The user interface may provide a convenient way for users of the network-connected devices to generate and communicate various types of data without requiring users to directly interact with the various hardware components of the device used to generate the data.

Within the same account, devices can be distinguished by assigning a device identifier to each device. The device identifier can be defined and assigned to uniquely identify the device within the same account name. This allows management of multiple IoT devices through a single account with different device names.

In addition to IoT functions, an account can also include social networking functions, thus unifying the IoT network with social network functionalities in the same interface.

Certain regulation and permission process can be implemented for connecting devices associated with different account names. For example, additional control mechanisms, such as a request and approval process, can be used to add a device to another device's "friend" list.

In some implementations, devices associated with different account names and devices associated with the same account name can be classified into two groups. The groupings can also be based on other criteria, and can include a mix of people and things. For example, one group can include devices and individuals associated with a family, and another group can include devices and individuals who are friends. Different policies can be defined and applied for managing the IoT devices and their interconnectivity with other devices or individuals.

As used herein, the term "Internet of Things device" (or "IoT device") may refer to any object (e.g., an appliance, a sensor, etc.) that has an addressable interface (e.g., an Internet protocol (IP) address, a Bluetooth identifier (ID), a near-field communication (NFC) ID), and can transmit information to one or more other devices over a wired or wireless connection. An IoT device may have a passive communication interface, such as a quick response (QR) code, radio-frequency identification (RFID) tag, an NFC tag, or the like, or an active communication interface, such as a modem, a transceiver, a transmitter-receiver, or the like.

An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function) that can be embedded in, controlled, or monitored by a central processing unit (CPU), microprocessor, ASIC, or the like.

For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc.

An IoT device can be configured for connection to an IoT network such as a local ad-hoc network or the Internet. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers).

Figure 1:
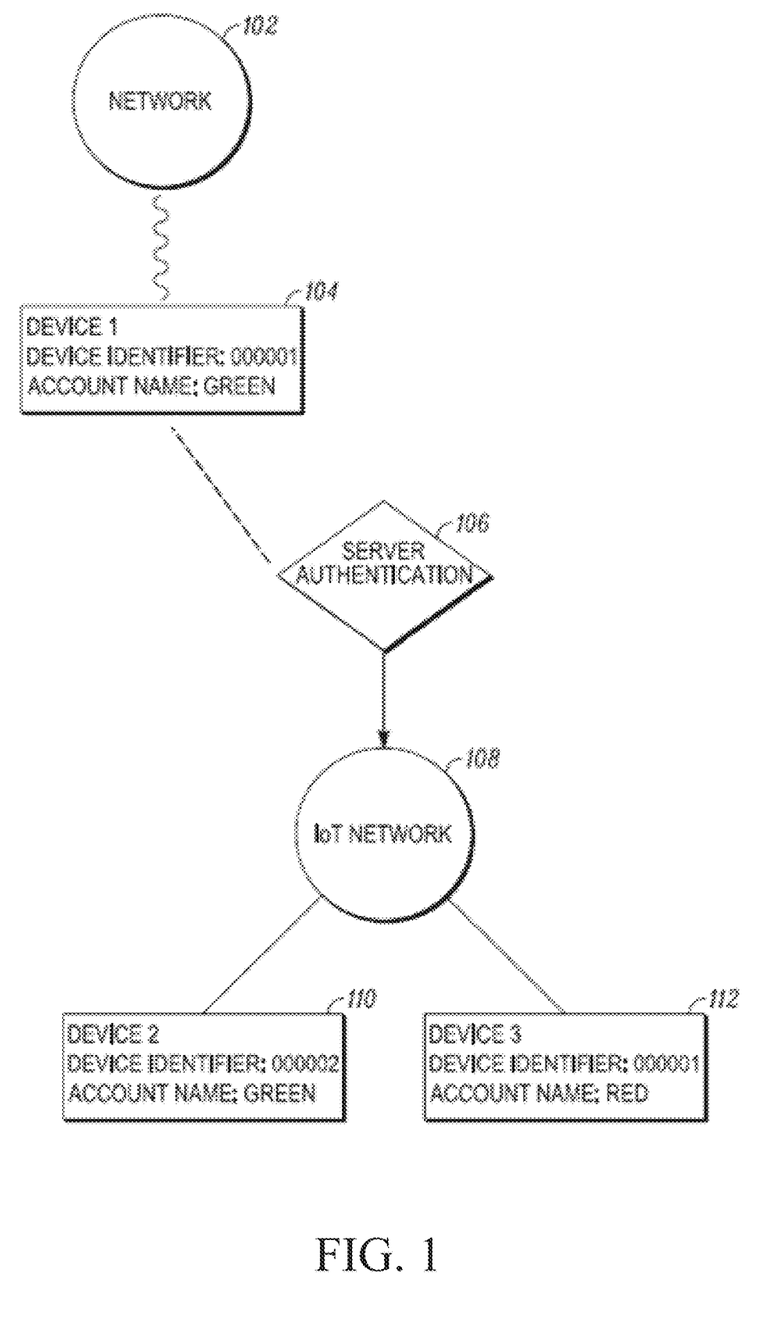
FIG. 1 is an illustration of a device attempting to initiate authentication with a server connected to an IoT network according to an implementation of the disclosure.

FIG. 1 illustrates device 104 which is attempting to initiate authentication (i.e., logging on) with server 106 connected to IoT network 108. Device 104 may optionally be connected to network 102, which may be the Internet, a private network, a public network, a social network and/or another IoT network. Network 102 may also include other devices which may have the same account name. For example, Device 104 can be associated with a device identifier ("000001") and an account name ("Green"). Each device identifier is associated with at least one device. The server 106 controls access to IoT network 108 and authenticates device 104 via the account name associated with the device ("Green"). IoT network 108, as depicted, is connected to devices 110 and 112 but may also be connected to the Internet, a private network, a public network, a social network, other IoT networks and/or other devices. Devices 110 and 112 are not connected because device 112 has a different account name ("Red") than device 110 ("Green") and thus belongs to a different group. Although device 110 has the same account name as device 104 and hence can belong to the same group, the device identifiers of devices 104 and 110 are different and hence exclusive to each device. Those of skill in the art will appreciate that devices which have the same account name are a special case of devices which belong to the same group.

Networks 102 and 108 may include wired or wireless network devices that enable communication such as routers, switches relays, or servers, or be connected to such devices. In some implementations, networks 102 and 108 may include a cloud computing environment. In other implementations, networks are local area networks, IoT networks or machine to machine networks. Accordingly, in some implementations, devices connected to networks 102 and 108 and to each other may be able to communicate autonomously via machine to machine technology.

Figure 2:
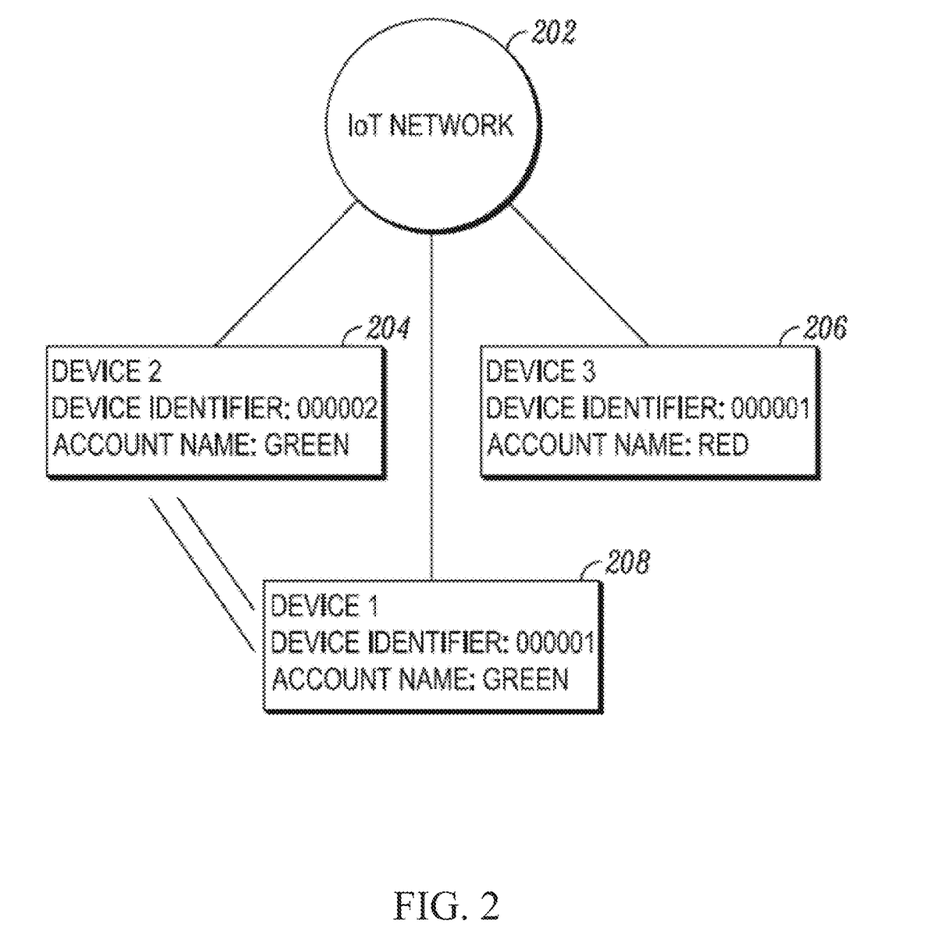
FIG. 2 is an illustration of an IoT network in which the device of FIG. 1 has been connected to another network-connected device according to an implementation of the disclosure.

FIG. 2 illustrates an IoT network 202 where device 204 is connected to device 208 which has the same account name. Here device 208 has been authenticated by a server (not shown) and connected to device 204 because devices 204 and 208 have the same account name and thus belong to the same group. Devices 204 and 208 are connected to each other but not to device 206 because device 206 has a different account name and thus belongs to a different group. In some implementations, devices 204 and 208 are automatically connected by machine to machine technology. In other implementations, devices 204 and 208 are automatically connected by a machine other than a server. Here, connection enables simple management and information exchange between devices 204 and 208 through the account name ("Green"). As illustrated in FIG. 2, the same account name ("Green") is logged on to the server on multiple devices (e.g., 204 and 208) which are distinguished by device identifiers (e.g., "000001" and "000002").

Figure 3:
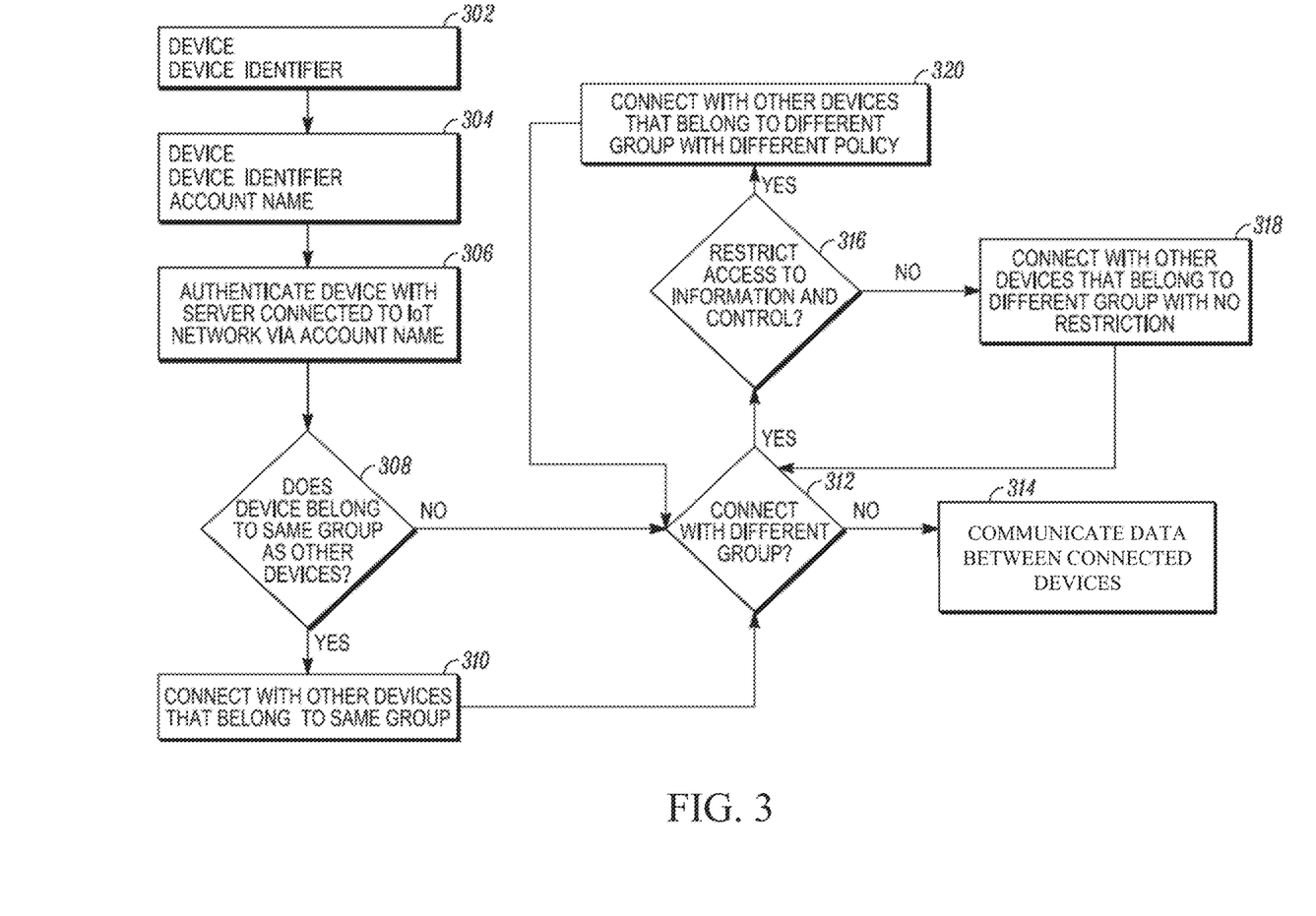
FIG. 3 is a flowchart of a method for connecting devices in an IoT network according to an implementation of the disclosure.

FIG. 3 is a flow chart which describes a method of connecting devices which belong to the same group and, if desired, with devices which belong to different groups in an IoT network. A device with a device identifier is shown at 302. An account name is associated with the device identifier at 304 via a communication protocol with, for example, a server. The account name may be, for example, any user account, email address, phone number or unique string within a server. In some implementations, the device identifier is associated with the account name by a resource field in an XMPP protocol. In other implementations, each device identifier is a Uniform Resource Identifier. In still other implementations, each device is associated with at least one unique device identifier for each account name. In some of the above implementations, an additional identification marker is associated with the device identifier and the account name by the resource field. For example, the additional identification marker may signify the device type and/or application version number.

At 306, the device is authenticated by account name and device identifier, by, for example, a server associated with the IoT network and the device is then logged into the IoT network. At decision branch 308, the account name of the device is compared to account names of other devices. If the account name of the device and the account name of another device belong to the same group, then the devices are connected for management and information exchange at 310. In some implementations, determining whether the account name of the device and the account name of another device belong to the same group requires determining whether the first account name and the second account name are the same. In other implementations, device connection takes place without either server or human intervention. In still other implementations, device connection is prompted by a machine other than the server. In still other implementations, device connection takes place through machine to machine communication. In still other implementations, devices are connected via spontaneous video or audio communication.

If the account name associated with the device authenticated by the server at 306 belongs to a different group than account names of other devices in the IoT network at 308, then a request and approval process, which uses either server or human intervention, can be initiated at 312 to connect devices associated with different groups. Similarly, devices connected at 310 may also connect with devices that belong to different groups by initiating a request and approval process at 312. If connection of devices which belong to different groups is not desired or is not approved, then the process continues to 314 where data is communicated between connected devices. The manner in which data is communicated and the types of data communicable between connected devices is discussed below in greater detail.

If connection with devices which belong to different groups is approved, then the process advances to 316 where a decision is made whether to restrict access to information and control. In some implementations, different policies may be automatically assigned for connecting devices which belong to different groups. In other implementations, policies may be assigned by human or server intervention for connecting devices which belong to different groups. If restricted access is desired, then at 318, connection of devices which belong to different groups is done with different policies for management and/or sharing information between the different groups. Thus, devices logged into the server which belong to the same group may have different policies for control and connectivity with devices logged into the server which belong to a different group. If identical management and complete information sharing between devices logged into the server which belong to different groups is desired, then at 320, devices which belong to different groups are connected with identical policies. After completing steps 318 and 320, the process loops back to 316 until termination at 314.

In some implementations, if connection with devices with different account names is approved, the other device may be added to a "friends list", so that in the future the process will connect the devices at 308 with the proper restrictions, thus obviating the need to proceed through steps 316 or 320.

Figure 4:
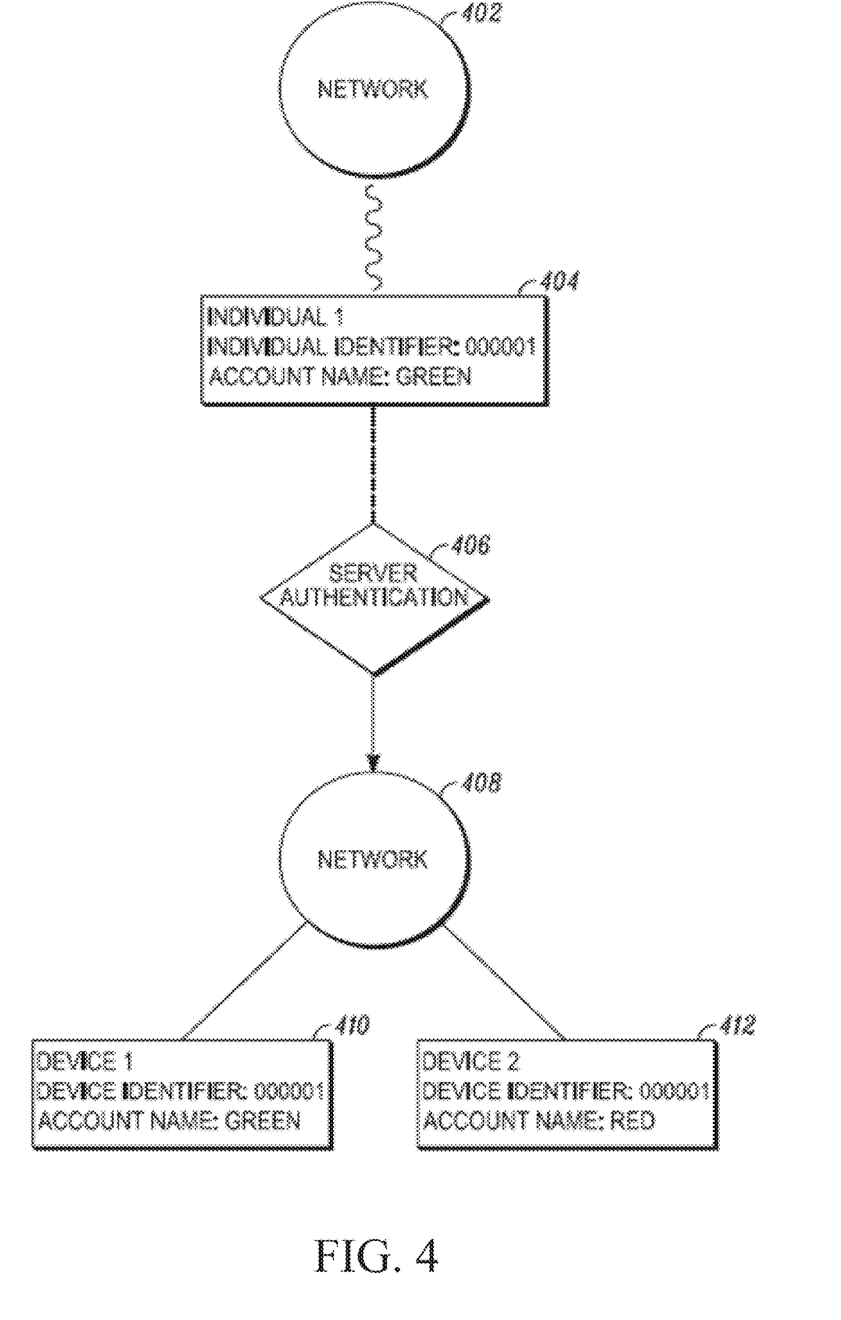
FIG. 4 is an illustration of an individual attempting to initiate authentication with a server connected to an IoT network according to an implementation of the disclosure.
Figure 5:
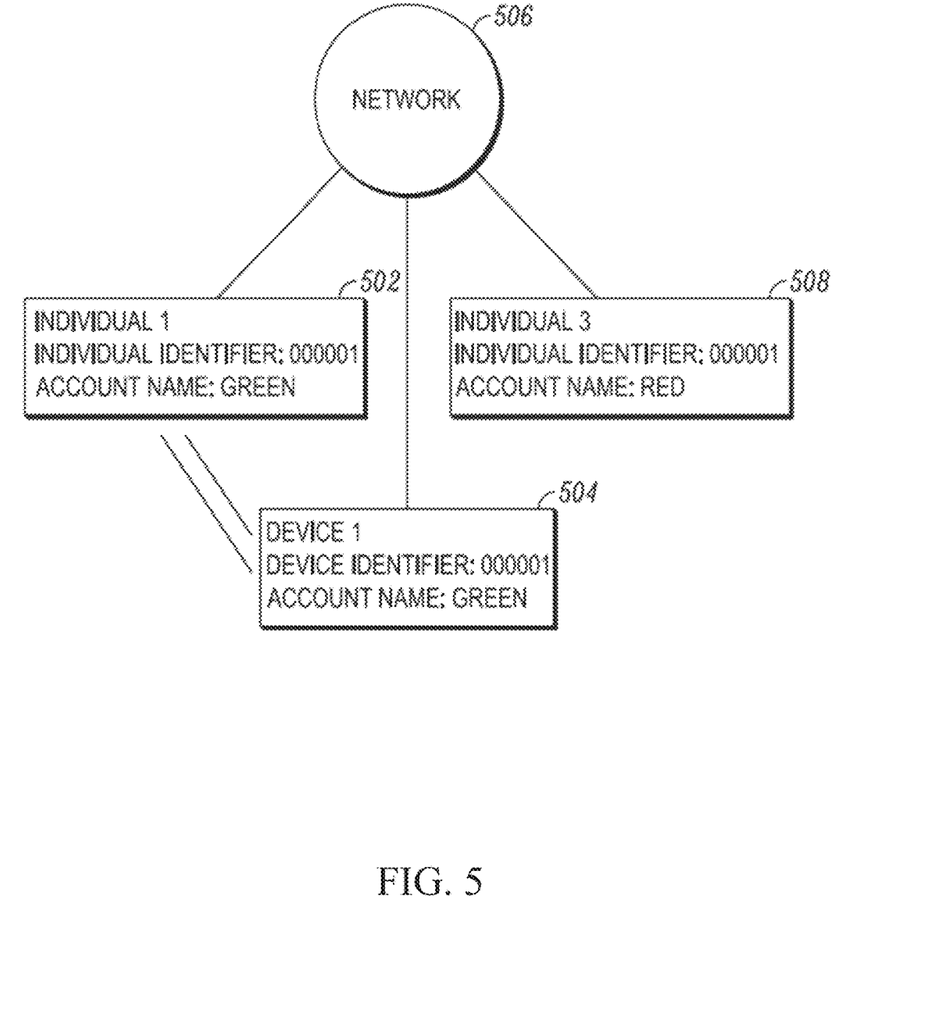
FIG. 5 is an illustration of an IoT network in which the individual of FIG. 1 has been connected to a network-connected device according to an implementation of the disclosure.
Figure 6:
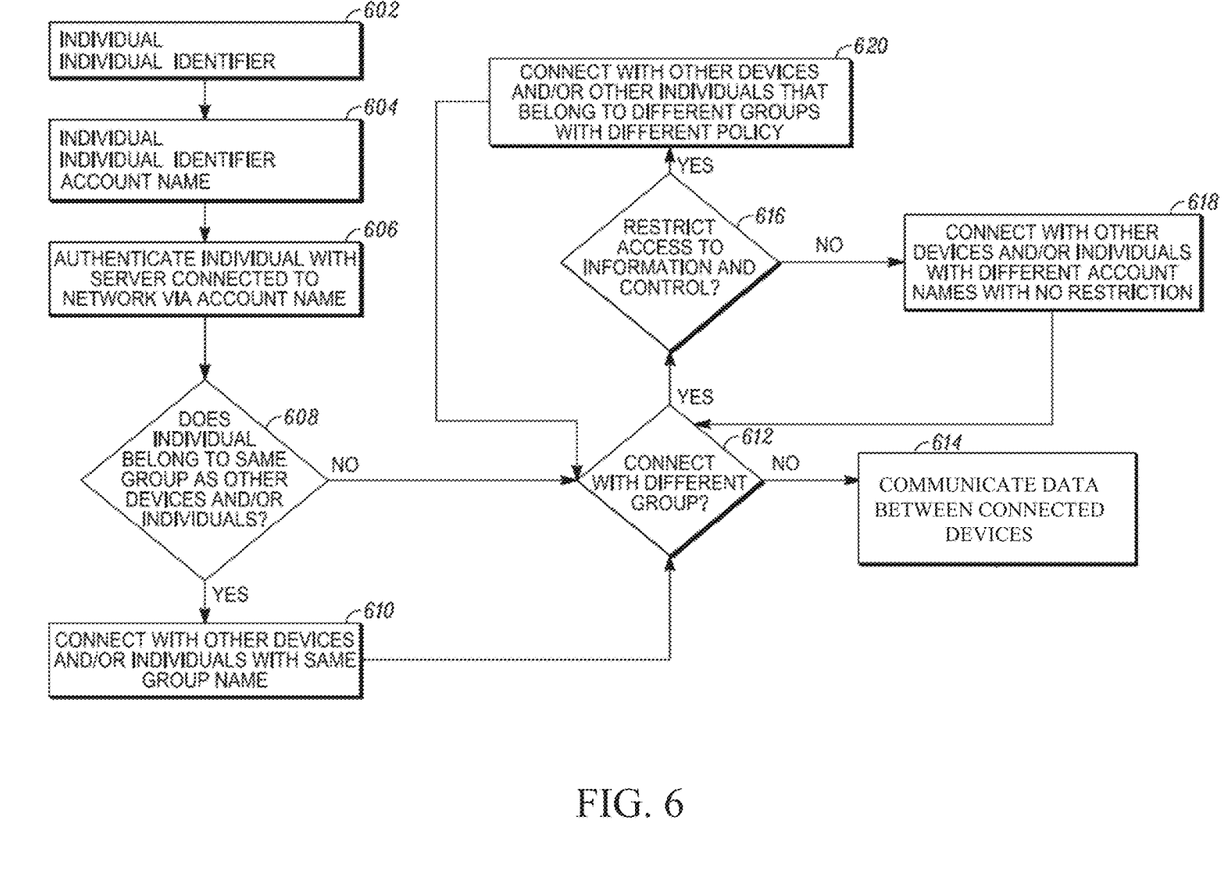
FIG. 6 is a flowchart of a method for connecting devices and individuals in an IoT network according to an implementation of the disclosure.

The design implemented in FIG. 3 can be used in a network that includes only individuals and both individuals and devices. The skilled artisan will immediately recognize that the process illustrated in FIG. 3 can be used in a network of individuals (i.e., a social network) to facilitate information exchange and management control through the use of an account name (not illustrated). FIGS. 4, 5 and 6, infra, explicitly illustrate using the above design in a network of devices and individuals to facilitate information exchange and management control through the use of an account name.

FIG. 4 illustrates individual 402 which is attempting to initiate authentication (e.g., logging on) with server 406 connected to network 408 which is connected to devices 410 and 412. Individual 404 may optionally be connected to network 402 which may be the Internet, a private network, a public network, a social network, or another IoT network. Network 402 may also include other devices and/or other individuals which have the same or different account name and hence belong to the same or different groups. Individual 404 is associated with an individual identifier ("000001") and an account name ("Green"). Each individual identifier is associated with at least one individual and in some implementations the individual identifier is unique for each account name. The server 404 controls access to network 408 and respectively authenticates the individual 402 via the account name associated with the individual ("Green").

Network 408, as depicted, is connected to devices 410 and 412 but may also be connected to the Internet, a private network, a public network, a social network, other IoT networks, other devices or other individuals. Devices 410 and 412 are not connected because device 412 has a different account name ("Red") than device 410 ("Green") and hence belongs to a different group.

FIG. 5 illustrates a network 506 which includes devices and individuals. Device 504 and individual 502 have the same account name and are hence connected since can belong to the same group. Here individual 502 has been authenticated by a server (not shown) and connected to device 504 because the device and the individual belong to the same group. Device 504 and individual 502 are connected to each other but not to device 506 because device 506 belongs to a different group. In some implementations, device 504 and individuals 502 are automatically connected by a machine other than a server. Here, connection enables simple management and information exchange between device 504 and individual 502 through the account name ("Green"). As illustrated in FIG. 5, the same account name ("Green") is logged on to the server on a device 504 and individual 502.

FIG. 6 explicitly illustrates using the design which uses groups to distinguish between devices in an IoT network as illustrated in FIG. 3 to distinguish between devices and individuals in a network which includes both individuals and devices. Accordingly, FIG. 6 is a flow chart which describes a method of connecting and individual and a device with have the same account name and belong to the same group with each other and, if desired, with devices which belong to different groups in a network which included both devices and individuals. An individual with an individual identifier is shown at 602. An account name is associated with the individual identifier at 604 via a communication protocol with, for example, a server. The account name may be, for example, any user account, email address, phone number or unique string within a server. In some implementations, the individual identifier is associated with the account name by a resource field in an XMPP protocol. In other implementations, each individual identifier is a Uniform Resource Identifier. In still other implementations, each individual is associated with at least one unique individual identifier for each account name. In some of the above implementations, an additional identification marker is associated with the device identifier and the account name by the resource field. For example, the additional identification marker may signify the device type and/or application version number.

At 606, the individual is authenticated by account name and individual identifier, by, for example, a server associated with the network and the device is then logged into the network. At decision branch 608, the account name of the individual is compared to account names of other devices or individuals. If the account name of the individual and the account name of the device and/or the account name of another individual belong to the same group, then the individual and device and/or individual are connected for management and information exchange at 610. In some implementations, determining whether the account name of the individual and the account name of a device and/or an individual belong to the same group requires determining whether the first account name and the second account name are the same. In other implementations, device connection takes place without either server or human intervention. In still other implementations, connection is prompted by a machine other than the server. In still other implementation are spontaneous video or audio communication is used to connect the individual with a device and/or other individual.

If the account name associated with the individual authenticated by the server at 606 belongs to a different group than account names of other devices and/or other individuals in the network at 608, then a request and approval process, which uses either server or human intervention can be initiated at 612 to connect individuals with devices and/or individuals associated with different groups. Similarly, individual connected at 610 with other devices and/or individuals may also connect with devices and/or individuals that belong to different groups by initiating a request and approval process at 612. If connection of individuals with devices and/or individuals which belong to different groups is not desired or is not approved, then the process terminates at 614.

If connection with individuals with devices and/or individuals which belong to different groups is approved, then the process advances to 616 where a decision is made whether to restrict access to information and control. In some implementations, different policies may be automatically assigned for connecting individuals with devices and/or individuals which belong to different groups. In other implementations, policies may be assigned by human or server intervention for connecting individuals with devices and/or individuals which belong to different groups. If restricted access is desired, then at 618, connection of individuals with devices and/or individuals which belong to different groups is done with different policies for management and/or sharing information between the different groups. Thus, individuals logged into the server which belong to the same group may have different policies for control and connectivity with devices and/or individuals which belong to different groups. If identical management and complete information sharing between individuals logged into the server with devices and/or individuals who belong to different groups is desired, then at 620, individuals and/or devices which belong to different groups are connected to the individual with identical policies. After completing steps 318 and 620, the process loops back to 616 until termination at 614.

The skilled artisan will appreciate that the implementation illustrated in FIG. 6 could be adapted to connect other devices and/or individuals to a network which includes both devices and/or networks.

In some implementations, if connection with devices with different account names is approved, the other device may be added to a "friends list", so that in the future the process will connect the devices at 608 with the proper restrictions, thus obviating the need to proceed through steps 616 or 620.

Notwithstanding the manner in which the devices become connected, once authenticated, devices connected through the IoT network will be able to communicate data to other connected devices. Communication in this context refers to the transmission of data from one connected device to another and may therefore include a first device generating data that is sent to a second device, a first device generating data that is identified by a second device (for example, as stored on a central server within the IoT), a first device identifying data that is sent to a second device, a first device indicating an identification of data to a second device, etc. Thus, the communication of data between a first device and a second device connected to the IoT network may include a transmission of electronic signals indicative of the data, a transmission of electronic signals indicative of an identification of some data, or some other exchange of data between the connected devices.

Figure 7:
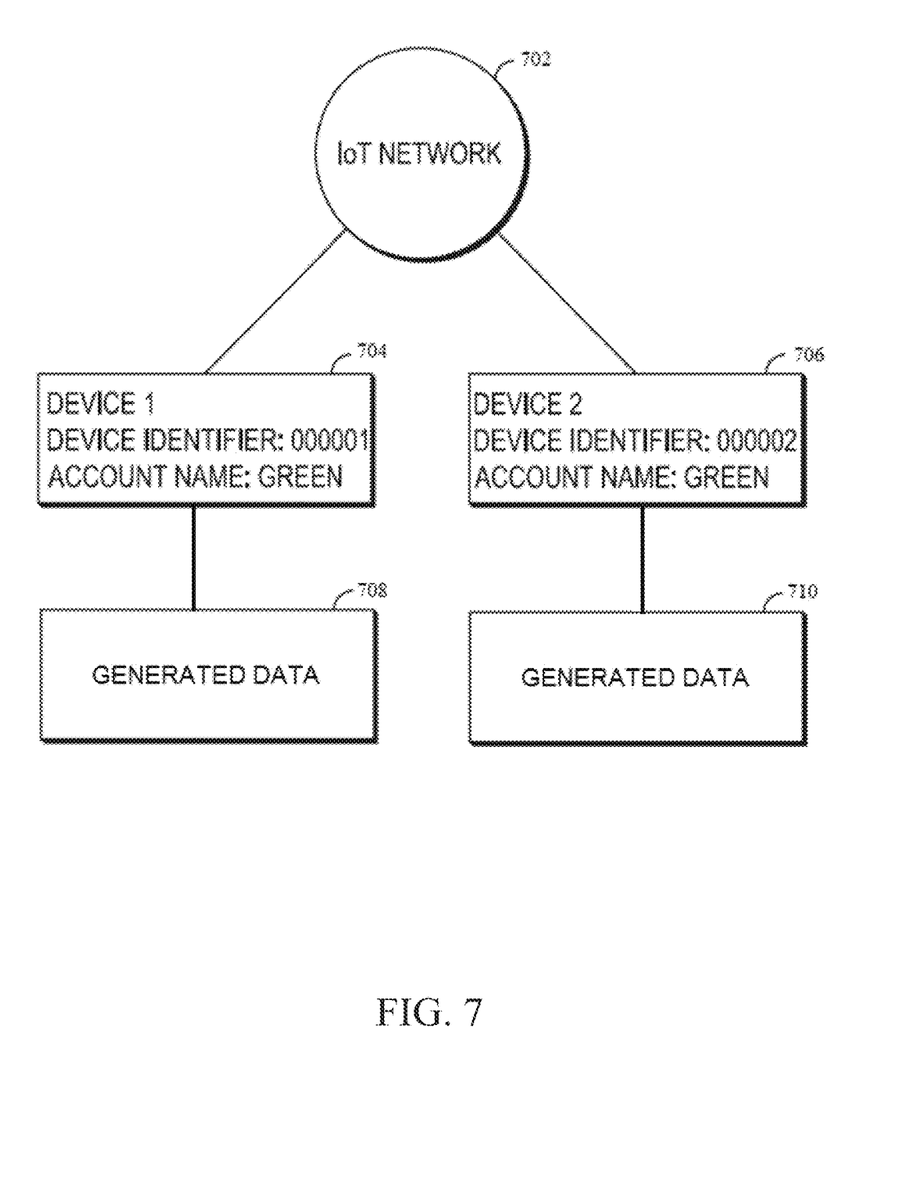
FIG. 7 is an illustration of an IoT network in which data is being communicated between two network-connected devices according to an implementation of the disclosure.

FIG. 7 illustrates an IoT network 702 where device 704 is connected to device 708 which has the same account name. Here, connection enables simple management and information exchange between devices 204 and 208 through the account name ("Green"). As illustrated in FIG. 2, the same account name ("Green") is logged on to the server on multiple devices (e.g., 204 and 208) which are distinguished by device identifiers (e.g., "000001" and "000002"). Thus, the connection enables data generated by connected device, such as generated data 708 as may have been generated by device 704, to be communicated using IoT network 702 to device 706, where the communicated data is received as generated data 710. Alternatively, generated data 710 generated by device 706 may be communicated using IoT network 702 to device 704 and received as generated data 708.

The types of data communicable between network-connected devices are dependent upon the types of devices connected to IoT network 702. For example, where device 704 and device 706 are both smartphone devices, the generated data 708 and/or 710 may generally be any type of data capable of being processed by a smartphone device; however, where either or both of device 704 and device 706 are sensors, such as sensors configured to detect an event or occurrence by indicating a binary signal, the generated data 708 and/or 710 may merely be the binary signal.

To illustrate the features of the disclosure, the following examples contemplate the network-connected devices 704 and 706 being mobile computing devices, such as smartphones. In an implementation, the data communicated between devices 704 and 706 may be video data, image data, audio data, alert data, or location data generated using components associated with the device on which the data is generated. Thus, for location data, a first device may generate data indicative of a real-time or near real-time location of that device, which data may thereafter be transmitted to the other device for reporting on that other device of the location of the first device. This may be used, for example, to locate a smartphone or other IoT-connected device when misplaced, lost, or stolen. The location data may comprise geolocation data, global positioning data, or any other type of data for identifying a connected device with respect to a physical reference point.

According to another example, the first device generates video data or image data using an image capture component, such as a front or rear-facing camera coupled to the smartphone, which is then transmitted to the other device. By generating video data, for example, a pair of connected devices may be utilized as a security system for real-time monitoring of a focused object or environment. In an implementation, the device receiving the transmitted video or image data may record the received video or image data for later viewing. The generated data may similarly be audio data generated using a sound capture component of the originating device.

The first device may generate alert data indicative of an event or occurrence detected using, for example, a sound or image capture component thereof. In an implementation, the alert data may be a text message or other electronic message signal generated to notify a device user of the detected event or occurrence. For example, the first device may be configured to detect motion or noises and, upon any such detection, may generate alert data indicative of the motion or noises and transmit same to the other device. This feature has applications, for example, in home and office security settings.

The generated data may also be an electronic command for an action to occur or a process to be executed by the device receiving same. That is, by way of another example, a first device may generate an electronic command as data requesting that the device to receive the command execute a sound file, such as a ringtone of a smartphone. This may be useful where a mobile device has been lost or misplaced, namely while a volume setting is set low or to silent, such that the mobile device may generate a noise to indicate its location.

Figure 8:
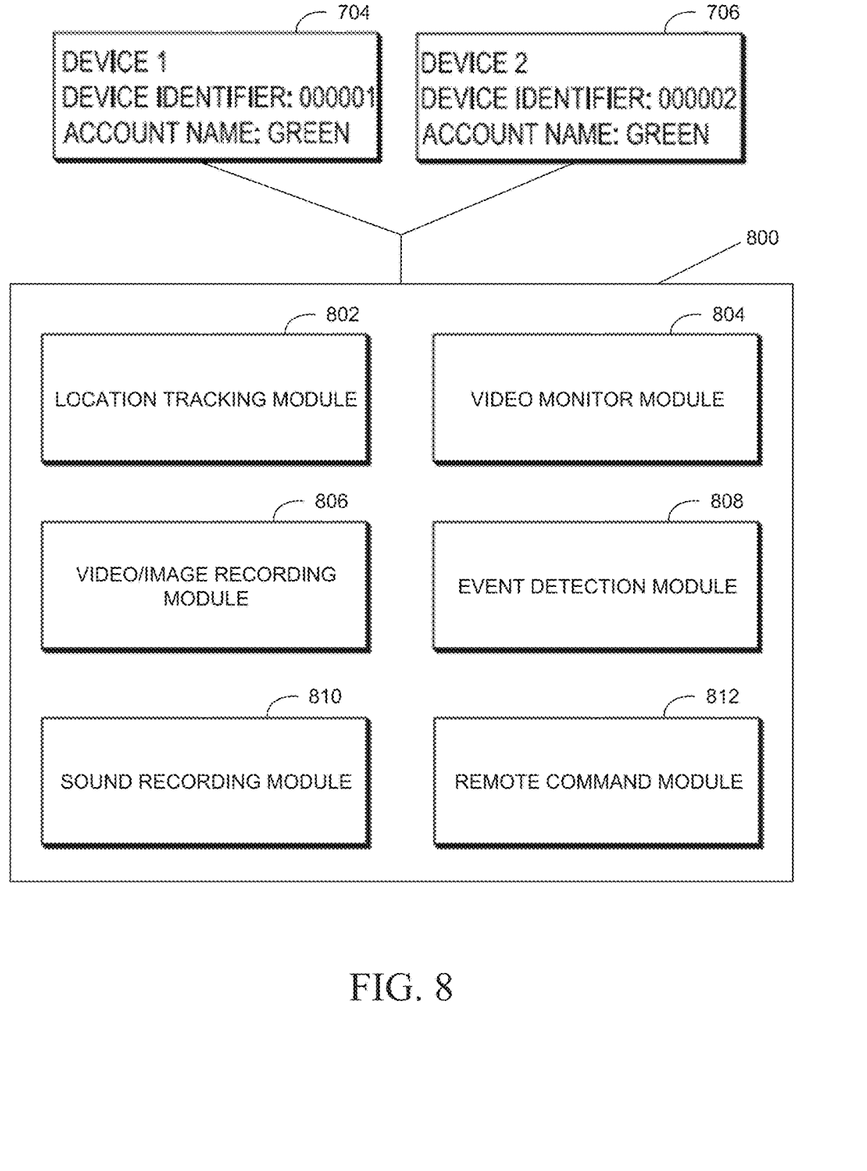
FIG. 8 is a diagram of modules for generating and communicating data by network-connected devices according to an implementation of the disclosure.

FIG. 8 is a diagram of modules for generating and communicating data by network-connected devices according to an implementation of the disclosure. In an implementation as illustrated in FIG. 8, the modules are integrated within a mobile application 800; however, the modules may instead be separate components and/or instructions for generating and communicating data using one of first device 704 and second device 706. To illustrate the features of the disclosure, the following examples contemplate the smartphone devices 704 and 706 executing the modules of FIG. 8 using the mobile application 800. The communication of data between smartphone 704 and smartphone 706 may be by way of any suitable communication system, such as Internet, intranet, Ethernet, WiFi, Bluetooth, near field communication, or any other form, including a connection type to IoT network 702, if different from the foregoing.

In an implementation, mobile application 800 comprises location tracking module 802, video monitor module 804, video/image recording module 806, event detection module 808, sound recording module 810, and remote command module 812. The various modules of mobile application 800 may be used for generating data through interaction with one or more hardware components of the device, communicating data to an authenticated network-connected device, or both. Use of one or more of the modules may be initiated by selecting the module within a user interface, for example, by pressing on an icon representative of the module using a touch screen input of smartphone 704 or 706. In an implementation, mobile application 800 comprises a user interface including icons representative of each of modules 802, 804, 806, 808, 810, and 812. In an implementation, one or more modules may be represented by a shared icon of the user interface of mobile application 800.

For example, the user interface of mobile application 800 may include an icon depicting a satellite representative of location tracking module 802. By selecting this icon, mobile application 800 causes a corresponding hardware component (e.g., a geolocation or global position system component) to generate location data. In an implementation, selecting the icon may instead or additionally cause the device to receive location data communicated to it by a device that generated the location data. Generating location data may include determining a location of smartphone 704, smartphone 706, or some other device authenticated within IoT network 702. For example, by selecting the icon representative of module 802, a user of smartphone 704 may generate location data indicative of a location of smartphone 706, which location data may be represented in any discernable form, including, without limitation, positional coordinates, a label on a digital map, a name or address of a residential, commercial, or other establishment at which smartphone 706 is detected, etc. Thus, the hardware component selected for generating the location data may be a component of smartphone 706, even where the instruction to generate the location data is provided to smartphone 704.

In another example, the user interface of mobile application 800 may include an icon depicting a camera representative of video monitor module 804 and/or video/image recording module 806. Selection of this icon by a user of smartphone 704 may cause a camera or other image capture component of smartphone 706 to generate video or image data (and, where video is concerned, a microphone or other sound capture component of smartphone 706 to generate audio data). Thus, a user of smartphone 704 may utilize smartphone 706 as a video monitoring device, for example, for monitoring the security of a home or business, or as a video or image recording device, for example, for recording video or image data from a distinct vantage.

In an implementation, the user interface of mobile application 800 may include features beyond those illustrated in the figure. For example, the user interface may permit a user to authenticate one or more network-connected devices, manage a list of authenticated devices, and maintain files comprising previously recorded video, image, or sound data generated by the user's device or communicated to the user's device by an authenticated device.

In a further implementation considering all implementations and contemplated disclosures as herein described, a second device (i.e., a device that receives data communicated between it and a device having generated the data) may comprise a plurality of devices. In this way, the generated data may be communicated to a plurality of devices for immediate mass dissemination. For example, where multiple devices are associated with a given account name and authenticated with the IoT network, data generated by a first such device may be communicated to all of the other such devices.

Many aspects described herein are in terms of sequences of actions to be performed by, for example, elements of a computing device. It will be recognized that various actions described herein can be performed by specific circuits, e.g., an application specific integrated circuit (ASIC), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

The various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

Thus, while the invention has been described in connection with certain embodiments, it is to be understood that the invention is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for establishing and using a direct connection between devices of an Internet of Things (IoT) network to communicate data, comprising:

authenticating the direct connection between a first device of the IoT network and a second device of the IoT network, wherein the authenticating includes using a server associated with the IoT network to process a first account name of the first device against a second account name of the second device;

responsive to the authenticating, establishing the direct connection between the first device and the second device over a communication system available to the IoT network;

using a component of the first device to generate the data, wherein the data is associated with the first device; and transmitting the data directly from the first device to the second device using the direct connection between the first device and the second device, wherein authenticating the direct connection between the first device of the IoT network and the second device of the IoT network comprises:

determining whether the first account name and the second account name are identical;

responsive to determining that the first account name and the second account name are not identical, determining whether the first account name and the second account name are both associated with one or more common groups; and responsive to determining that the first account name and the second account name are not both associated with the one or more common groups, determining whether a connection restriction is imposed by one of the first device and the second device on the other, wherein, if the first account name and the second account name are identical, the first account name and the second account name are both associated with the one or more common groups, or the connection restriction is not imposed, the first device and the second device are authenticated such that the direct connection between the first device and the second device is permitted, and wherein, if the first account name and the second account name are not identical, the first account name and the second account name are not both associated with the one or more common groups, and the connection restriction is imposed, the first device and the second device are not authenticated such that the direct connection between the first device and the second device is not permitted.

2. The method of claim 1, wherein using the component of the first device to generate the data comprises:

generating, by a geolocation component of the first device, location data indicative of a real-time location of the first device or of a near real-time location of the first device.

3. The method of claim 1, wherein using the component of the first device to generate the data comprises:

generating, using an image capture component associated with the first device, video data or image data.

4. The method of claim 3, further comprising:
subsequent to transmitting the video data or the image data directly from the first device to the second device, recording, by the second device, the transmitted video data or the transmitted image data.

5. The method of claim 1, wherein using the component of the first device to generate the data comprises:
generating, using one or both of an image capture component or a sound capture component associated with the first device, alert data indicative of an event or occurrence detected by the first device.

6. The method of claim 1, wherein using the component of the first device to generate the data comprises:
generating, using a sound capture component associated with the first device, sound data.

7. The method of claim 1, wherein using the component of the first device to generate the data comprises
generating, by the first device, an electronic command for a sound file associated with the second device, wherein the electronic command includes a request to play the sound file at the second device,
wherein transmitting the data directly from the first device to the second device using the direct connection between the first device and the second device comprises transmitting the electronic command from the first device to the second device, and
wherein the method further comprises executing, by the second device, the received electronic command to cause the second device to play the sound file.

8. The method of claim 1, wherein the second device comprises a plurality of devices.

9. The method of claim 1, further comprising:
assigning one or more connection policies for directly connecting the first device and the second device based on whether the first account name and second account name are both associated with one or more common groups.

10. An apparatus for establishing and using a direct connection between devices of an Internet of Things (IoT) network to communicate data, comprising:
at least one memory; and
at least one processor configured to execute instructions stored in the at least one memory to:
authenticate the direct connection between a first device of the IoT network and a second device of the IoT network, wherein the instructions to authenticate the direct connection include instructions to use a server associated with the IoT network to process a first account name of the first device against a second account name of the second device;
responsive to the authentication, establish the direction connection between the first device and the second device over a communication system available to the IoT network;
use a component of the first device to generate the data, wherein the data is associated with the first device; and
transmit the data directly from the first device to the second device using the direct connection between the first device and the second device, wherein the instructions to authenticate the direct connection between the first device of the IoT network and the second device of the IoT network include instructions to:
determine whether the first account name and the second account name are identical;
responsive to a determination that the first account name and the second account name are not identical, determine whether the first account name and the second account name are both associated with one or more common groups; and
responsive to a determination that the first account name and the second account name are not both associated with the one or more common groups, determine whether a connection restriction is imposed by one of the first device and the second device on the other,
wherein, if the first account name and the second account name are identical, the first account name and the second account name are both associated with the one or more common groups, or the connection restriction is not imposed, the first device and the second device are authenticated such that the direct connection between the first device and the second device is permitted, and
wherein, if the first account name and the second account name are not identical, the first account name and the second account name are not both associated with the one or more common groups, and the connection restriction is imposed, the first device and the second device are not authenticated such that the direct connection between the first device and the second device is not permitted.

11. The apparatus of claim 10, wherein the instructions to use the component of the first device to generate the data include instructions to:
generate, by a geolocation component of the first device, location data indicative of a real-time location of the first device or of a near real-time location of the first device.

12. The apparatus of claim 10, wherein the instructions to use the component of the first device to generate the data include instructions to:
generate, using an image capture component associated with the first device, video data or image data.

13. The apparatus of claim 12, wherein the instructions include instructions to:
subsequent to a transmission of the video data or the image data directly from the first device to the second device, record, by the second device, the transmitted video data or the transmitted image data.

14. The apparatus of claim 10, wherein the instructions to use the component of the first device to generate the data include instructions to:
generate, using one or both of an image capture component or a sound capture component associated with the first device, alert data indicative of an event or occurrence detected by the first device.

15. The apparatus of claim 10, wherein the instructions to use the component of the first device to generate the data include instructions to:
generate, using a sound capture component associated with the first device, sound data.

16. The apparatus of claim 10, wherein the instructions to use the component of the first device to generate the data include instructions to generate, by the first device, an electronic command for a sound file associated with the second device, wherein the electronic command includes a request to play the sound file at the second device,
wherein the instructions to transmit the data directly from the first device to the second device using the direct connection between the first device and the second device includes instructions to transmit the electronic command from the first device to the second device, and wherein the instructions further include instructions to execute, by the second device, the received electronic command to cause the second device to play the sound file.

17. The apparatus of claim 10, wherein the second device comprises a plurality of devices.

18. The apparatus of claim 10, further comprising:
assigning one or more connection policies for directly connecting the first device and the second device based on whether the first account name and second account name are both associated with one or more common groups.

19. A non-transitory computer-readable medium storing a set of instructions which when executed by a computer system using a processor become operational with the processor for resource allocation, the non-transitory computer-readable medium comprising instructions to:
authenticate the direct connection between a first device of the IoT network and a second device of the IoT network, wherein the instructions to authenticate the direct connection include instructions to use a server associated with the IoT network to process a first account name of the first device against a second account name of the second device, wherein the instructions to authenticate the direct connection between the first device of the IoT network and the second device of the IoT network include instructions to:
determine whether the first account name and the second account name are identical;
responsive to a determination that the first account name and the second account name are not identical, determine whether the first account name and the second account name are both associated with one or more common groups; and
responsive to a determination that the first account name and the second account name are not both associated with the one or more common groups, determine whether a connection restriction is imposed by one of the first device and the second device on the other,
wherein, if the first account name and the second account name are identical, the first account name and the second account name are both associated with the one or more common groups, or the connection restriction is not imposed, the first device and the second device are authenticated such that the direct connection between the first device and the second device is permitted, and
wherein, if the first account name and the second account name are not identical, the first account name and the second account name are not both associated with the one or more common groups, and the connection restriction is imposed, the first device and the second device are not authenticated such that the direct connection between the first device and the second device is not permitted;
responsive to the authentication, establish the direction connection between the first device and the second device over a communication system available to the IoT network;
use a component of the first device to generate the data, wherein the data is associated with the first device; and
transmit the data directly from the first device to the second device using the direct connection between the first device and the second device.

20. The non-transitory computer-readable medium of claim 19, wherein the instructions to use the component of the first device to generate the data include instructions to:
generate, by a geolocation component of the first device, location data indicative of a real-time location of the first device or of a near real-time location of the first device.

* * * * *